United States Patent
Stordahl, Jr.

[11] 3,888,546
[45] June 10, 1975

[54] PROPORTIONING VALVE SYSTEM FOR REAR BRAKING CIRCUIT

[75] Inventor: Calmer M. Stordahl, Jr., Metamora, Mich.

[73] Assignee: General Motors Corporation, Detroit, Mich.

[22] Filed: Nov. 14, 1973

[21] Appl. No.: 415,566

[52] U.S. Cl............... 303/6 C; 188/349; 303/24 C
[51] Int. Cl............................................. B60t 8/14
[58] Field of Search....... 303/6 C, 24 R, 24 C, 24 F; 188/349

[56] References Cited
UNITED STATES PATENTS

| | | | |
|---|---|---|---|
| 2,924,306 | 2/1960 | Martin | 188/349 X |
| 3,476,443 | 11/1969 | Bratten et al. | 188/349 X |
| 3,576,350 | 4/1971 | Larsen | 303/21 F |
| 3,588,188 | 6/1971 | Shattock | 303/24 C X |
| 3,700,286 | 10/1972 | Bueler | 303/6 C |
| 3,729,237 | 4/1973 | Ishikawa | 303/6 C X |
| 3,768,868 | 10/1973 | Hirai et al. | 303/6 C |

*Primary Examiner*—Trygve M. Blix
*Assistant Examiner*—Barry L. Kelmachter
*Attorney, Agent, or Firm*—D. D. McGraw

[57] ABSTRACT

A vehicle brake system in which the brake circuit for the rear wheel brakes has two proportioning valves in series flow relation, the one closest to the master cylinder being actuatable at relatively low input pressure to begin proportioning fluid to the brakes, and the other being actuatable at a substantially higher input pressure to begin proportioning brake apply pressure to the brakes. A bypass conduit in the rear brake system is connected so as to be able to bypass the low pressure proportioner subject to certain vehicle conditions of operation sensed in a manner to operate a control valve to open or close the bypass conduit. A deceleration sensing valve is provided for this purpose since vehicle deceleration is related to vehicle load. The valve also senses the master cylinder output pressure which is delivered to the proportioning valves.

1 Claim, 5 Drawing Figures

PROPORTIONING VALVE SYSTEM FOR REAR BRAKING CIRCUIT

The invention relates to a mechanical control for a vehicle rear brake pressure proportioning system, and more particularly to one which senses a vehicle operational condition and the amount of brake pressure required in relation to the amount being supplied, and establishing the operational control of the rear brake apply pressure by means of a low input pressure actuated proportioning valve or a high input pressure actuated proportioning valve, depending upon the vehicle operational condition being sensed.

In the field of truck braking, the variation in truck loads carried has a very strong effect on the braking characteristics. A light vehicle, such as an unloaded truck, requires much less master cylinder pressure to stop at any desired deceleration than does the same vehicle when heavily loaded. The system embodying the invention establishes a decision line between the master cylinder output pressure that is required to stop a lightly loaded vehicle at various decelerations to that required to stop a heavily loaded vehicle at various decelerations. The system and the control mechanism forming a part of the invention use this decision line to determine whether or not the vehicle is acting as a lightly loaded vehicle or a heavily loaded vehicle during braking. If the system determines that the vehicle is on the lightly loaded side of the decision line, it establishes a relatively low pressure proportioning valve as the controlling proportioning valve so that the brake apply pressure received by the rear brakes is proportioned beginning at a relatively low master cylinder output pressure level. If the system determines that the vehicle is on the heavily loaded side of the decision line, it establishes a substantially higher input pressure proportioning valve as the controlling proportioning valve so that a substantially higher master cylinder output pressure input is attained before the proportioning valve begins to proportion the brake apply pressure to the rear brakes. By placing the high pressure proportioning valve downstream from the low pressure proportioning valve, the high pressure valve will not affect the system since it does not begin to function unless the pressures are higher than those that can be sensed through the low pressure valve.

In the preferred embodiment illustrated, a weight and valve control mechanism senses vehicle deceleration and master cylinder output pressure to establish the desired control relationship. The decision line established by this relationship may be adjusted by changing the spring load on the weight which changes the required deceleration to actuate the control valve mechanism.

The system utilizes the principle set forth in copending application Ser. No. 415,773 filed on even date herewith, entitled "Brake Control Proportioning System," and assigned to the common assignee.

IN THE DRAWINGS

Figure 1:
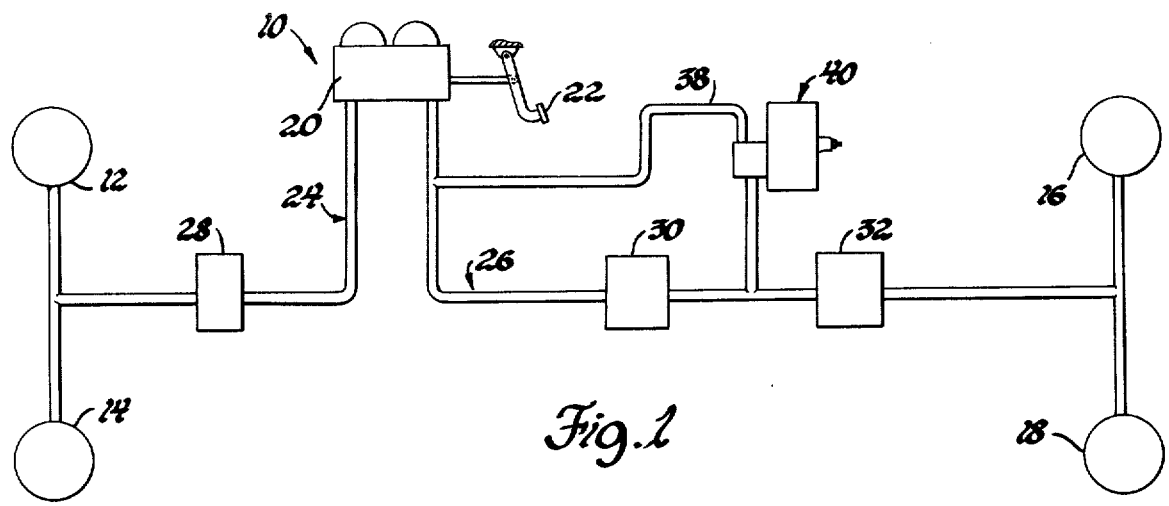
FIG. 1 is a schematic illustration of a vehicle brake system embodying the invention.

The vehicle brake system 10 of FIG. 1 is illustrated as being installed in a vehicle having a pair of front brakes 12 and 14 and a pair of rear brakes 16 and 18. A master cylinder 20 is schematically illustrated as being actuatable by brake pedal 22 to provide brake fluid under pressure to the brakes. It is the dual circuit type, with one conduit 24 connected to the front brakes 12 and 14 and another conduit 26 connected to the rear brakes 16 and 18. As is common in the art, the master cylinder has separate pressurizing chambers for the two brake circuits represented by conduit 24 and 26. In a vehicle with front disc brakes a metering valve 28 is also provided in conduit 24.

The rear brake circuit includes a first proportioning valve 30 and a second proportioning valve 32 which are positioned in series fluid flow relation in conduit 26 so that the brake fluid for the brake system 20 passes from the master cylinder 20 through the proportioning valve 30, then through the proportioning valve 32, and then to the rear brakes. Proportioning valve 30 is actuatable at a first predetermined master cylinder output pressure level to begin proportioning brake apply pressure to the rear brakes. This level is substantially lower than the master cylinder pressure output level at which proportioning valve 32 can begin proportioning brake pressure to the rear brakes. These two pressure levels are shown respectively as points 34 and 36 in the graph of FIG. 4. In the particular arrangement from which this graph was made the proportioning valve 30 begins to proportion at approximately 200 p.s.i. master cylinder output pressure, while valve 32 begins to proportion at approximately 450 p.s.i.

The bypass conduit 38 is fluidly connected with conduit 26 on each side of proportioning valve 30 so that when conduit 38 is open master cylinder output pressure is delivered directly to the input side of proportioning valve 32 and proportioning valve 30 is rendered ineffective. When conduit 38 is closed, the master cylinder output pressure in the rear brakes is delivered to proportioning valve 30 and the brake apply pressure from that valve normally does not rise to a sufficiently high pressure to have the proportioning valve 32 begin its proportioning operation. Thus valve 32 is not the controlling valve in this mode of operation.

Figures 2, 2A:
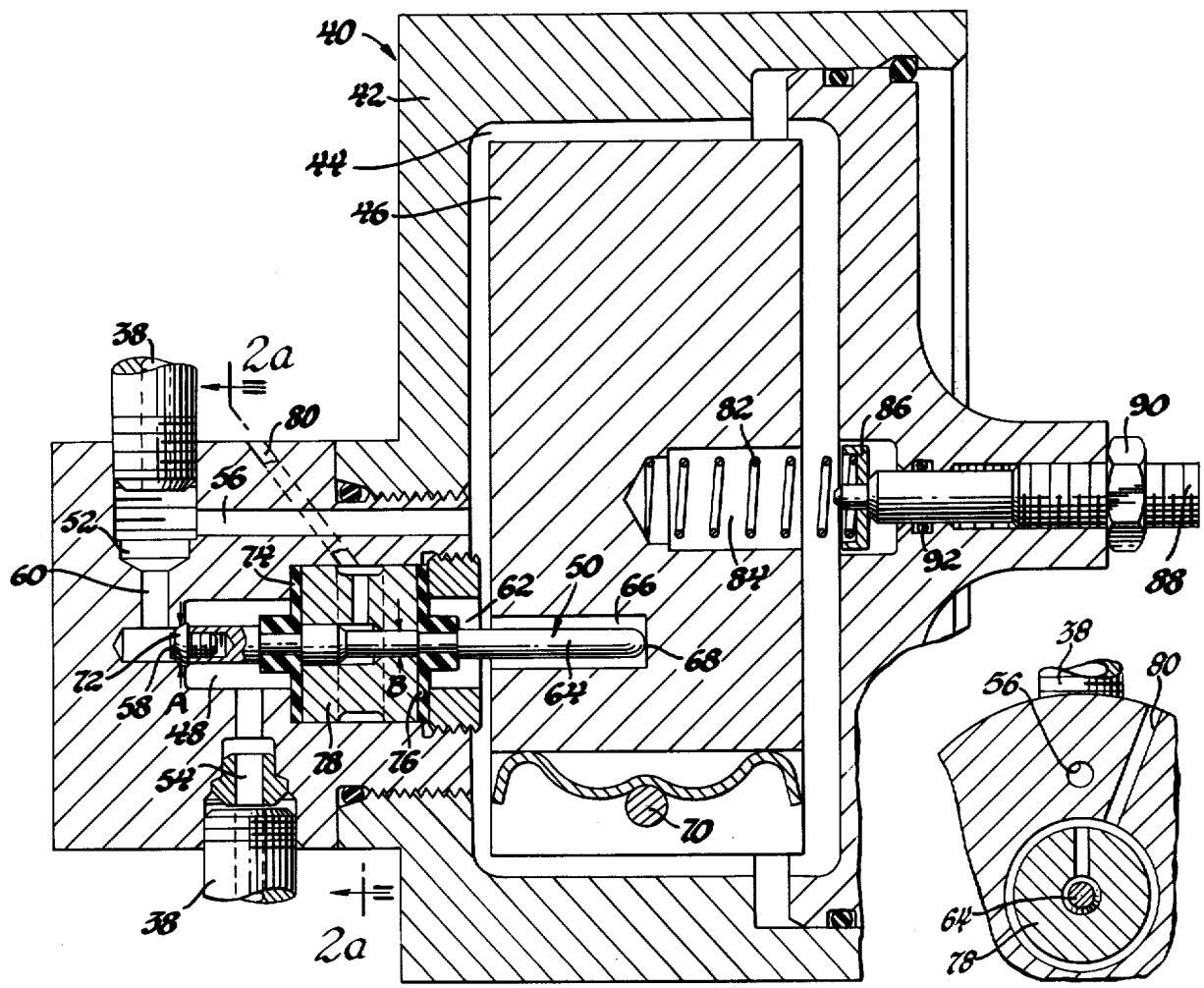
FIG. 2 is a cross-section view of the vehicle condition sensing valve mechanism embodying the invention and forming a part of the system of FIG. 1.
FIG. 2a is a fragmentary cross-section view taken in the direction of arrows 2a of FIG. 2.

A vehicle condition sensing mechanism and valve 40 is fluidly positioned in conduit 38 so that the valve portion can selectively open and close that conduit. This mechanism and valve is illustrated in FIG. 2. It includes a housing 42 and a chamber 44 formed therein and containing a deceleration sensing weight 46. The housing also has a valve chamber 48 in which the valve assembly 50 is positioned. A brake supply pressure inlet 52 is connected with the portion of conduit 38 leading from the master cylinder 20, and a brake supply pressure outlet 54 is connected with the portion of conduit 38 leading to the portion of conduit 26 between proportioning valves 30 and 32. A passage 56 connects inlet 52 and chamber 44. The valve chamber 48 has one end formed to provide an annular valve seat 58, which is connected with inlet 52 by means of passage 60. The other end 62 of valve chamber 48 receives an extension 64 of the valve assembly 50 therethrough so that the valve extension 64 is exposed to master cylinder supply pressure in chamber 44. The extension is freely located in an enlarged recess 66 formed in weight 46 and is in point contact with the weight 46 at point 68 so that movement of the weight about its pivot 70 in chamber 44 toward valve chamber 48 urges the valve assembly 50 toward valve seat 58.

The valve assembly 50 has a valve 72 positioned in chamber 48 for cooperation with valve seat 58, the valve and valve seat defining an effective pressure area A exposed to the master cylinder output pressure in inlet 52 and passage 60. The valve extension 64 has a smaller effective pressure area B exposed to the pressure in chamber 44. A pair of seals 74 and 76 are positioned in valve chamber 48 on opposite sides of a seal spacer 78 so that the fluid pressure in valve chamber 48, which is connected with outlet 54, cannot be fluidly connected with chamber 44. The center portion of spacer 78, through which a portion of the valve extension 64 passes, is vented to atmosphere through vent 80 to further prohibit any direct fluid pressure transfers between chambers 44 and 48 along the valve extension 64. A weight adjusting mechanism is provided which includes a preloaded compression spring 82 received in a seat recess 84 and seated on adjustable spring seat 86. Adjusting rod 88 and its lock nut 90 are provided, with rod 88 extending through a seal 92 in housing 42 and supporting spring seat 86. Spring 84 acts on weight 46 to urge the weight to move pivotally forward in relation to the vehicle and toward valve seat 58. When the brakes are applied, the forces generated on the valve assembly 50 by the master cylinder output pressure acting on the differential areas A and B result in an effective force opposing the action of spring 84 and the vehicle deceleration pivotal movement of weight 46.

Figure 3:
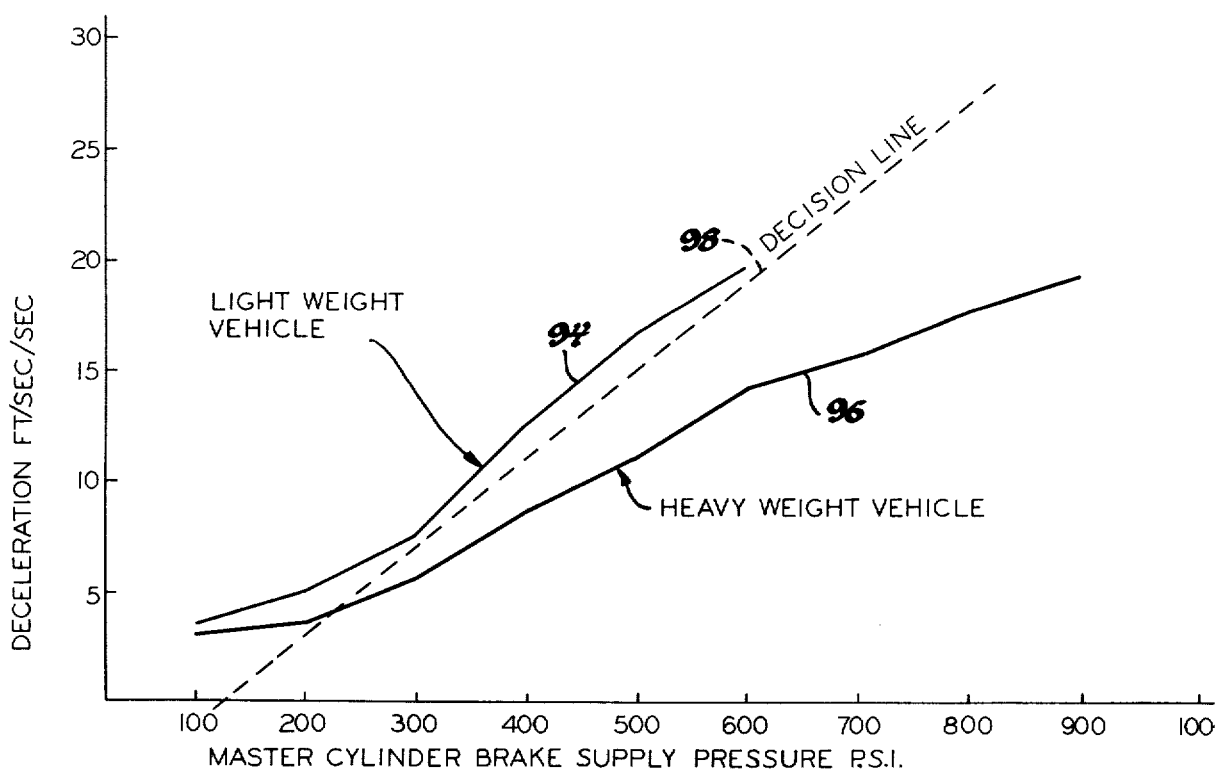
FIG. 3 is a graphic illustration of a typical decision line and the performance of light and heavy weight vehicles, with master cylinder pressure being plotted against vehicle deceleration.

FIG. 3 shows a graph of the different decelerations obtained by the same vehicle when it is lightly loaded and when it is heavily loaded, plotted against master cylinder output pressure. Curve 94 shows the higher decelerations obtained in relation to the master cylinder output pressures when the vehicle is lightly loaded. Curve 96 shows the relatively lower decelerations obtained in relation to the master cylinder output pressures when the vehicle is heavily loaded. The dashed line 98 represents a line used to provide a predetermined deceleration rate for the master cylinder pressures generated, and is referred to as a decision line. This line is established so that the deceleration curve for lightly loaded vehicles is above the line and the deceleration curve for heavily loaded vehicles is below the line. When the actual deceleration obtained in comparison to the actual master cylinder output pressure acting on valve assembly 50, as measured by pivotal movement of weight 46, falls on the upper side of the decision line 98, the weight 46 overcomes the differential area force on valve assembly 50 generated by the master cylinder output pressure acting across areas A and B to seat valve 72 against valve seat 58, thereby closing off pressure communication through conduit 38 from master cylinder 20 directly to proportioning valve 32. This establishes proportioning valve 30 as the control proportioning valve. When the master cylinder output pressure reaches point 34 of FIG. 4, proportioning valve 30 then proportions brake apply pressure to the rear brakes along curve 100. When actual deceleration obtained in relation to the master cylinder output pressure supplied falls below decision line 58 on curve 96, the deceleration is insufficient to move weight 46, and the pressure acting on the pair of areas A and B moves valve 72 to open and permit master cylinder output pressure to be delivered to the inlet side of proportioning valve 32. Thus the full master cylinder output is supplied to the rear brakes as brake apply pressure until it reaches point 36 of the curve of FIG. 4. It is then proportioned so that with further increases in the brake supply pressure from the master cylinder causes the brake apply pressure out of proportion valve 32 to follow curve 102.

The adjusting spring 82 is adjustable to exert different loads on the system. By changing the spring load, decision line 98 can be displaced upwardly or downwardly for a given master cylinder pressure to facilitate use of the invention on different types of vehicles. It can also be used to tune the system to the particular vehicle in which it is installed. It may be calibrated with the mechanism tipped at some predetermined angle so that the weight exerts a force on valve extention 64 by gravity, therebeing then applied a pressure to the valve through inlet 52. By adjusting the spring force, the decision line can be set to match any desired location shown on FIG. 3 within the limitations of the adjustment range.

The slope of decision line 98 is determined by the difference in areas A and B of the valve assembly. By increasing or decreasing this difference the slope may be made steeper or flatter as needed to match different vehicle types. The system is resistant to surge since both ends of the valve are supplied with the same master cylinder output pressure at the same instant. Therefore, the valve will not feel an erroneous momentary pressure with deceleration unbalances. The system is always fully charged, eliminating any tendency for the bypass valve seat 58 and its cooperating valve 72 to have a venturi effect when the valve opens. Since the system is always charged, only minimal valve movement is required to obtain a pressure rise in the outlet 54 and the portion of conduit 38 attached thereto. This also minimizes the fluid flow required through valve seat 58 when valve 72 opens.

Figure 4:
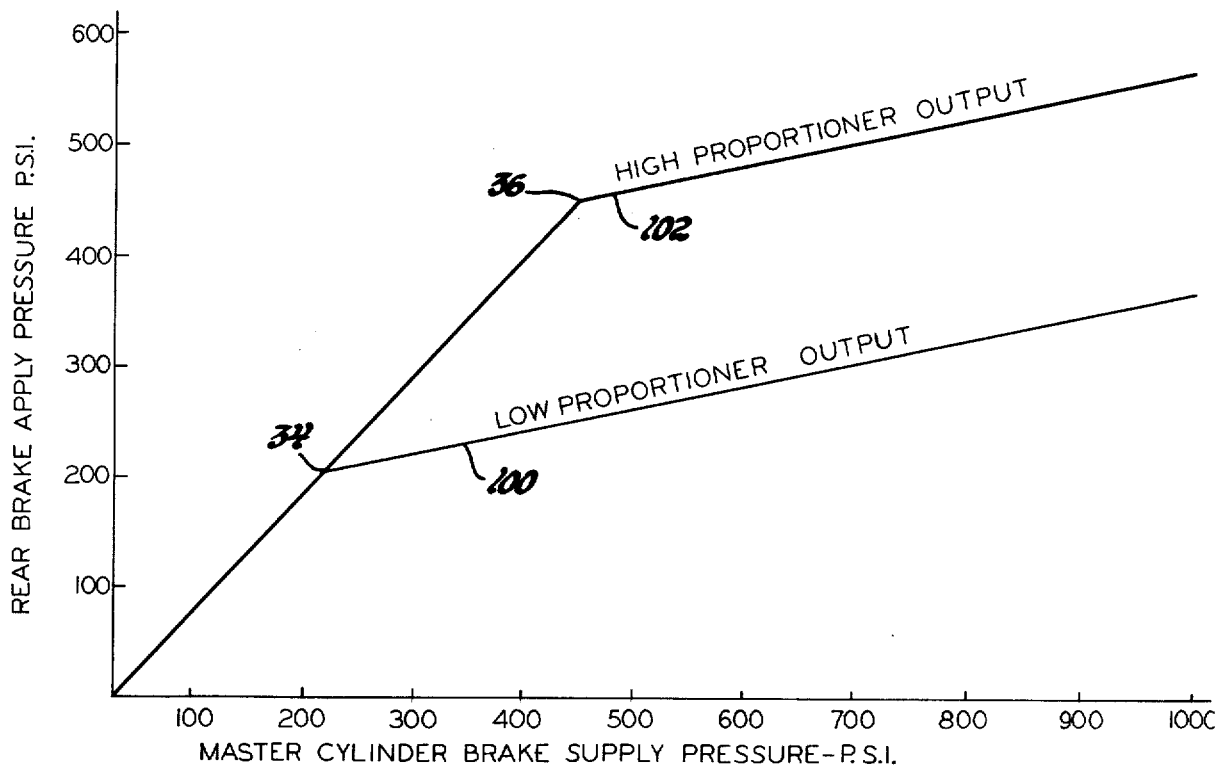
FIG. 4 is a graphic illustration of the performance of the system, showing the master cylinder pressure plotted against the rear brake apply pressure, and particularly showing the points at which the system proportioning valves begin to function.

The unit is capable of making a redecision at any time during the stop. For example, if the vehicle operator increases the desired deceleration during the stop by increasing the master cylinder output pressure, and the system had previously determined to use proportioning valve 30 for that stop, the unit can redecide to use the proportioning valve 32 instead, and the rear brake apply pressure will immediately increase to the higher level. Conversely, if the need were to be to redecide to use proportioning valve 30, the rear brake apply pressure would be constant at the point of redecision. For example, if the redecision point occurred at 300 p.s.i. brake apply pressure as seen in FIG. 4, the rear brakes would continue to receive 300 p.s.i. apply pressure for all master cylinder pressures above that until the master cylinder pressure input reaches 700 p.s.i. Further increases in master cylinder pressure would then cause the brake apply pressure to rise along curve 100.

It is claimed:

1. A vehicle brake pressure control valve and valve control mechanism comprising:

a housing having a fluid pressure inlet and a fluid pressure outlet and a valve chamber having an intermediate chamber section connected with said outlet and having opposite ends connected with said inlet, one of said chamber ends being formed about one inlet connection to provide a valve seat;

a valve assembly reciprocably received in said valve chamber and engageable with said valve seat at said one inlet connection to open and close said one inlet connection when reciprocably moved and having a first area exposed to inlet pressure at said one inlet connection, a second area opposed to and smaller than said first area and maintaining the other chamber inlet connection closed and exposed to inlet pressure, said chamber intermediate section and said outlet being fluid connected with said inlet through said one inlet connection when said valve is positioned to open said one inlet connection;

a vehicle deceleration sensing member positioned to act on said valve assembly against the force differential generated by said unbalanced valve areas and fluid pressure at said inlet acting thereon to overcome that force differential and move said valve to close said one inlet connection when the relationship between vehicle deceleration and the inlet pressure exceeds a predetermined ratio;

and adjustable biasing means acting on said deceleration sensing member in one direction and adjustable to change the predetermined ratio between vehicle deceleration and inlet pressure.

* * * * *